United States Patent
Honda (10) Patent No.: US 9,496,535 B2
(45) Date of Patent: Nov. 15, 2016

(54) SEPARATOR WITH HEAT RESISTANT INSULATION LAYER

(71) Applicant: NISSAN MOTOR CO., LTD., Kanagawa (JP)

(72) Inventor: Takashi Honda, Kawasaki (JP)

(73) Assignee: Nissan Motor Co., Ltd., Yokohama-Shi, Kanagawa (JP)

( * ) Notice: Subject to any disclaimer, the term of this patent is extended or adjusted under 35 U.S.C. 154(b) by 157 days.

(21) Appl. No.: 14/349,006

(22) PCT Filed: Sep. 28, 2012

(86) PCT No.: PCT/JP2012/075022
§ 371 (c)(1),
(2) Date: Apr. 1, 2014

(87) PCT Pub. No.: WO2013/051468
PCT Pub. Date: Apr. 11, 2013

(65) Prior Publication Data
US 2015/0056494 A1 Feb. 26, 2015

(30) Foreign Application Priority Data

Oct. 4, 2011 (JP) .................................. 2011-220436

(51) Int. Cl.
*H01M 2/14* (2006.01)
*H01M 2/16* (2006.01)
(Continued)

(52) U.S. Cl.
CPC ............ *H01M 2/1686* (2013.01); *H01G 11/52* (2013.01); *H01M 2/145* (2013.01); *H01M 2/1653* (2013.01); *H01M 2/1646* (2013.01); *H01M 10/0525* (2013.01);
(Continued)

(58) Field of Classification Search
CPC ............................ H01M 2/1686; H01M 2/166
See application file for complete search history.

(56) References Cited

U.S. PATENT DOCUMENTS 8,795,826 B2 8/2014 Lee et al.
2009/0098450 A1 4/2009 Kikuchi et al.
(Continued)

FOREIGN PATENT DOCUMENTS

EP 1900514 A1 3/2008
EP 2124271 A1 11/2009
(Continued)

OTHER PUBLICATIONS

Communication and Extended European Search Report, dated Jan. 30, 2015, from the corresponding European Patent Application No. 12838922.8.

*Primary Examiner* — Stewart Fraser
*Assistant Examiner* — Olatunji Godo
(74) *Attorney, Agent, or Firm* — Young Basile Hanlon & MacFarlane, P.C.

(57) ABSTRACT

A separator with a heat resistant insulation layer includes a porous substrate layer and a heat resistant insulation layer formed on one surface or both surfaces of the porous substrate layer and containing inorganic particles and a binder. The ratio of tensile strength in MD direction×fracture strain in MD direction to the tensile strength in TD direction×fracture strain in RD direction is in a range from 0.3 to 20. A ratio of the unit mass of the heat resistant insulation layer to the unit mass of the porous substrate layer is in a range from 0.5 to 2.5. Accordingly, the separator with a heat resistant insulation layer can have improved resistance to an internal short-circuit (shorting resistance).

19 Claims, 4 Drawing Sheets (51) Int. Cl.
*H01G 11/52* (2013.01)
*H01M 10/0525* (2010.01)

(52) U.S. Cl.
CPC .......... *H01M 2220/20* (2013.01); *Y02E 60/13* (2013.01); *Y02T 10/7011* (2013.01); *Y02T 10/7022* (2013.01)

(56) References Cited

U.S. PATENT DOCUMENTS

| | | | |
|---|---|---|---|
| 2009/0098465 A1 | 4/2009 | Kikuchi et al. | |
| 2009/0117453 A1 | 5/2009 | Kikuchi et al. | |
| 2009/0117454 A1 | 5/2009 | Takita et al. | |
| 2009/0123822 A1 | 5/2009 | Takita et al. | |
| 2010/0068612 A1 | 3/2010 | Nishikawa | |
| 2011/0027642 A1 | 2/2011 | Lee et al. | |
| 2011/0143183 A1 | 6/2011 | Matsumoto et al. | |
| 2011/0165450 A1* | 7/2011 | Nishikawa | H01M 2/145 429/145 |
| 2011/0165469 A1 | 7/2011 | Nishikawa | |
| 2011/0311878 A1 | 12/2011 | Inagaki et al. | |
| 2013/0344395 A1 | 12/2013 | Inagaki et al. | |
| 2014/0295061 A1 | 10/2014 | Lee et al. | |

FOREIGN PATENT DOCUMENTS

| | | |
|---|---|---|
| EP | 2328220 A2 | 6/2011 |
| JP | 11080395 A | 3/1999 |
| JP | 2009185093 A | 8/2009 |
| JP | 2010202828 A | 9/2010 |
| JP | 2010-240936 A | 10/2010 |
| JP | 2011-500881 A | 1/2011 |
| JP | 2011113919 A | 6/2011 |
| JP | 2011113921 A | 6/2011 |
| JP | 2011-519385 A | 7/2011 |
| JP | 2011192447 A | 9/2011 |
| KR | 20080022082 A | 3/2008 |
| KR | 20090107442 A | 10/2009 |
| WO | 2006137540 A1 | 12/2006 |
| WO | 2007049568 A1 | 5/2007 |
| WO | 2008062727 A1 | 5/2008 |
| WO | 2009125984 A2 | 10/2009 |
| WO | 2010070930 A1 | 6/2010 |
| WO | 2010147407 A2 | 12/2010 |

\* cited by examiner

SEPARATOR WITH HEAT RESISTANT INSULATION LAYER

CROSS REFERENCE TO RELATED APPLICATION

The present application claims priority to Japanese Patent Application No. 2011-220436, filed Oct. 4, 2011, incorporated herein in its entirety.

TECHNICAL FIELD

The present invention relates to a separator with a heat resistant insulation layer. More particularly, the present invention relates to a separator with a heat resistant insulation layer suitable for use in an electric device such as a lithium ion secondary battery or an electric double-layer capacitor mounted on an electric vehicle.

BACKGROUND

There has been a strong demand for reduction of emissions of carbon dioxide in order to deal with global warming. In the automobile industry, the reduction of emissions of carbon dioxide is highly expected in association with the spread of electric vehicles (EV) and hybrid electric vehicles (HEV). Thus, development of secondary batteries for driving motors as a key to practical application of such vehicles, is actively being carried out.

Lithium-ion secondary batteries for driving motors are required to have quite high output characteristics and high energy in comparison with generally-used lithium-ion secondary batteries for use in, for example, mobile phones and laptop computers. Thus, lithium ion secondary batteries having relatively high theoretical energy are gaining increased attention among other types of batteries and development thereof is being made rapidly.

A lithium ion secondary battery generally has a configuration in which a positive electrode and a negative electrode are connected via a separator containing an electrolyte, which are housed in a battery case. The positive electrode is obtained in a manner such that a positive electrode active material is applied to both surfaces of a positive electrode current collector by use of a binder. The negative electrode is obtained in a manner such that a negative electrode active material is applied to both surfaces of a negative electrode current collector by use of a binder. The separator is required to not only hold an electrolysis solution to ensure lithium ion conductivity between the positive electrode and the negative electrode but also serve as a partition between the positive electrode and the negative electrode. In addition, the separator preferably has a function to prevent movement of lithium ions (a shutdown function) to stop a charge-discharge reaction when the battery reaches a high temperature. As for such a separator, a microporous film containing thermoplastic resin such as polyolefin is conventionally used.

When the separator containing a soft material such as polyolefin is used, however, foreign body pieces entering at the time of manufacturing the battery or electrode active material layer pieces exfoliated from the electrodes, penetrate the separator, which may cause an internal short circuit.

In view of such a problem, for example, Japanese Patent Unexamined Publication No. 11-080395 teaches that a surface protection layer containing inorganic fine particles and having ventilation is formed at least on one surface of a film having a porous structure so as to prevent an internal short circuit.

SUMMARY OF INVENTION

However, the separator described in Japanese Patent Unexamined Publication No. 11-080395 is assumed to be used in a battery installed mainly in an electronic device. Therefore, it was found that an internal short circuit may not be prevented sufficiently when such a separator is applied to a large lithium ion secondary battery for an electric vehicle having a high capacity and high output power.

The present invention has been made in view of the conventional problem. An object of the present invention is to provide a separator with a heat resistant insulation layer having high resistance to an internal short circuit (short-circuit resistance).

A separator with a heat resistant insulation layer according to an aspect of the present invention includes a porous substrate layer, and a heat resistant insulation layer formed on one surface or both surfaces of the porous substrate layer and containing inorganic particles and a binder. R represented by the following mathematical formula 1 is in a range from 0.3 to 20, and a ratio of an unit mass of the heat resistant insulation layer to an unit mass of the porous substrate layer (unit mass of heat resistant insulation layer/unit mass of porous substrate layer) is in a range from 0.5 to 2.5.

$$R = \frac{\text{Tensile Strength in } MD \text{ Direction} \times \text{Fracture Strain in } MD \text{ Direction}}{\text{Tensile Strength in } TD \text{ Direction} \times \text{Fracture Strain in } TD \text{ Direction}} \quad (1)$$

BRIEF DESCRIPTION OF DRAWINGS

The description herein makes reference to the accompanying drawings wherein like reference numerals refer to like parts throughout the several views, and wherein.

DESCRIPTION OF EMBODIMENTS

Hereinafter, embodiments of the present invention will be explained with reference to the drawings. It should be noted that dimensional ratios in the drawings are magnified for convenience of explanation and may be different from actual ratios.

A separator with a heat resistant insulation layer according to the present embodiment includes a porous substrate layer, and a heat resistant insulation layer containing inorganic particles and a binder and formed on one surface or both surfaces of the porous substrate layer. The separator with a heat resistant insulation layer is characterized in that R represented by the mathematical formula 1 described above is in the range from 0.3 to 20, and in that the ratio of the unit mass of the heat resistant insulation layer to the unit mass of the porous substrate layer is in the range from 0.5 to 2.5.

<Separator with Heat Resistant Insulation Layer>

Figure 1:
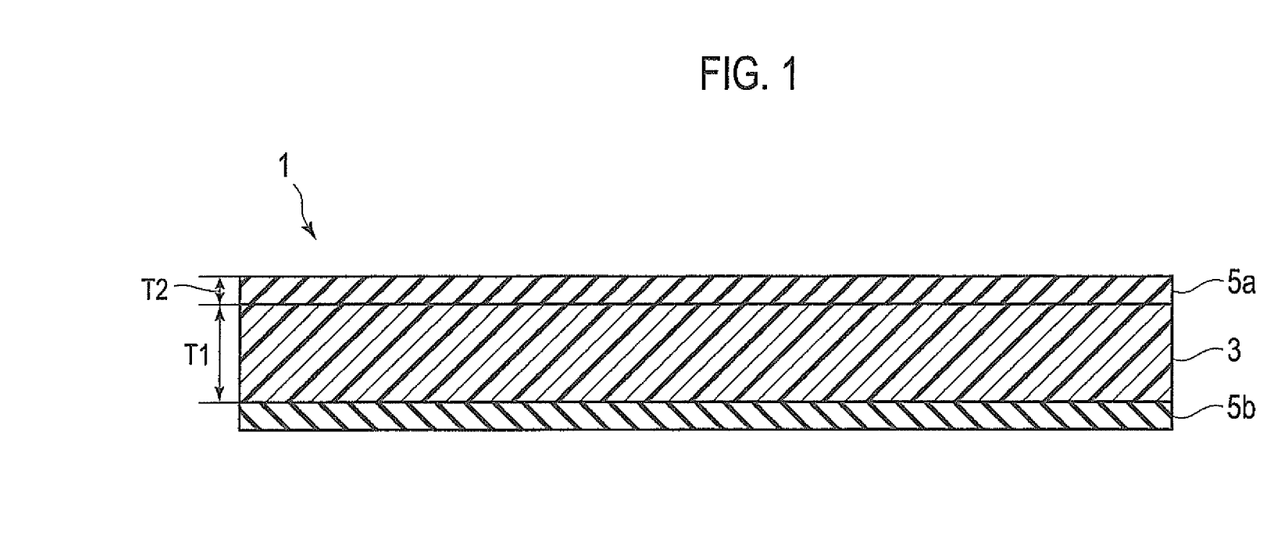
FIG. 1 is a cross-sectional view schematically showing a separator with a heat resistant insulation layer according to an embodiment of the present invention.

FIG. 1 is a cross-sectional view schematically showing the separator with a heat resistant insulation layer according to the present embodiment. The separator with a heat resistant insulation layer 1 corresponds to a separator with a heat resistant insulation layer prepared in Example 3 described below. The separator with a heat resistant insulation layer 1 includes heat resistant insulation layers 5a and 5b formed on both surfaces of a porous substrate layer 3. The porous substrate layer 3 is a microporous film containing polyethylene (PE; melting temperature of 130° C.). The heat resistant insulation layers 5a and 5b contain alumina ($Al_2O_3$) particles which are connected to each other via carboxymethyl cellulose (CMC) serving as a binder. The heat resistant insulation layers 5a and 5b have a porous structure due to gaps provided between the adjacent alumina particles. Thus, the entire separator with a heat resistant insulation layer 1 also has a porous structure. The separator with a heat resistant insulation layer 1 thus functions as a separator having lithium ion conductivity. The separator with a heat resistant insulation layer 1 has R represented by the mathematical formula 1 described above which is 1.71, and has a ratio of the unit mass of the heat resistant insulation layers 5a and 5b to the unit mass of the porous substrate layer 3 which is 1.2. Due to such values of R and the unit mass ratio, the separator with a heat resistant insulation layer 1 can ensure higher short-circuit resistance than conventional separators. The following is a specific explanation of each element in the separator with a heat resistant insulation layer according to the present invention.

[Porous substrate layer] In the present embodiment, the porous substrate layer serves as a substrate used when the heat resistant insulation layer is formed. The material contained in the porous substrate layer is not particularly limited, but may be a resin material such as thermoplastic resin or thermosetting resin, a metal material, or a cellulose material. Among these materials, the resin material is preferably used in the porous substrate layer in order to provide the shutdown function to the separator with a heat resistant insulation layer. Hereinafter, the porous substrate layer containing the resin material is also referred to as "a resin porous substrate layer".

Examples of the resin material contained in the resin porous substrate layer include polyethylene (PE), polypropylene (PP), a copolymer obtained by copolymerizing ethylene and propylene (an ethylene-propylene copolymer), a copolymer obtained by copolymerizing ethylene or propylene and a monomer other than ethylene and propylene, polystyrene (PS), polyvinyl acetate (PVAc), polyethylene terephthalate (PET), polyvinylidene fluoride (PVDF), polytetrafluoroethylene (PTFE), polysulfone (PSF), polyether sulfone (PES), polyetheretherketone (PEEK), polyimide (PI), polyamideimide (PAI), phenol resin (PF), epoxy resin (EP), melamine resin (MF), urea resin (UF), alkyd resin, and polyurethane (PUR). These resins may be used alone or in combination of two or more.

The resin material contained in the resin porous substrate layer preferably contains resin having a melting temperature in the range from 120° C. to 200° C. in order to provide the shutdown function in the temperature range from 120° C. to 200° C. to the separator with a heat resistant insulation layer. In particular, the resin porous substrate layer preferably contains polyethylene; polypropylene; an ethylene-propylene copolymer; or a copolymer obtained by copolymerizing ethylene or propylene and a monomer other than ethylene and propylene.

When the resin material contained in the resin porous substrate layer contains the resin with the melting temperature in the range from 120° C. to 200° C., thermoplastic resin or thermosetting resin having a melting temperature exceeding 200° C. may be used together. In such a case, the ratio of the resin with the melting temperature in the range from 120° C. to 200° C. to the entire resin porous substrate layer is preferably 50% by mass or greater. The ratio of the resin with the melting temperature in the range from 120° C. to 200° C. is more preferably 70% by mass or greater, still more preferably 90% by mass or greater, particularly preferably 95% by mass, most preferably 100% by mass.

Alternatively, a laminated body in which two or more layers containing the materials described above are laminated may be used as the resin porous substrate layer. An example thereof may be a resin porous substrate layer having a triple-layer structure of PP/PE/PP. The resin porous substrate layer with the triple-layer structure exhibits the shutdown function when the battery temperature reaches 130° C. since the melting temperature of PE is 130° C. Even if the battery temperature exceeds 130° C., a short circuit can be prevented in the entire surface of the separator since the melting temperature of PP is 170° C. Accordingly, the separator with further improved safety can be provided.

The configuration of the resin porous substrate layer is not particularly limited and may be woven fabric, nonwoven fabric, or a microporous film. Among these, a microporous film is preferably used in order to ensure high lithium ion conductivity. The porosity of the resin porous substrate layer is preferably in the range from 40% to 85%, more preferably in the range from 50% to 70%, still more preferably in the range from 55% to 60%. The porosity within such a range can ensure sufficient lithium ion conductivity and strength.

The thickness T1 of the resin porous substrate layer is not particularly limited, but is preferably in the range from 1 μm to 200 μm, more preferably in the range from 5 μm to 100 μm, still more preferably in the range from 7 μm to 30 μm, particularly preferably in the range from 10 μm to 20 μm. The thickness of 5 μm or greater contributes to a high capacity of holding the electrolyte, and the thickness of 200 μm or smaller can avoid excessive increase in resistance.

[Heat resistant insulation layer] The heat resistant insulation layer, which is placed on one surface or both surfaces of the porous substrate layer, functions to reinforce the separator and has an electrical insulation property. In particular, when the porous substrate layer is a resin porous substrate layer containing the resin material, internal stress caused by an increase in battery temperature can be reduced, and deformation of the separator due to thermal contraction can be prevented. Note that the heat resistant insulation layer contains inorganic particles and a binder as essential components.

(Inorganic particles) The inorganic particles contribute to improving the mechanical strength and preventing thermal contraction in the heat resistant insulation layer. The material used as the inorganic particles is not particularly limited. For example, the inorganic particles preferably contain at least one material selected from the group consisting of an oxide ($SiO_2$, $Al_2O_3$, $ZrO_2$ or $TiO_2$), a hydroxide and a nitride of silicon, aluminum, zirconium or titanium. The inorganic particles may consist of at least one material selected from the group consisting of an oxide, a hydroxide and a nitride of silicon, aluminum, zirconium or titanium. The inorganic particles may be a complex containing at least one of an oxide, a hydroxide and a nitride of silicon, aluminum, zirconium or titanium. The inorganic particles may be a material derived from a mineral source such as boehmite, zeolite, apatite, kaolin, mullite, spinel, olivine, and mica, or an artificially-produced material thereof. The inorganic particles described above may be used alone or in combination of two or more. Among these, silica ($SiO_2$) or alumina ($Al_2O_3$) is preferable in view of cost effectiveness, and alumina ($Al_2O_3$) is particularly preferable.

(Binder) The binder functions to bind the inorganic particles together or bind the inorganic particles to the porous substrate layer. The binder contributes to stably forming the heat resistant insulation layer and preventing separation between the porous substrate layer and the heat resistant insulation layer.

The binder used in the heat resistant insulation layer according to the present embodiment is not particularly limited, and a conventionally-known material may be used as appropriate. For example, a compound such as carboxymethyl cellulose (CMC), polyacrylonitrile, cellulose, an ethylene-vinyl acetate copolymer, polyvinyl chloride, styrene butadiene rubber (SBR), isoprene rubber, butadiene rubber, polyvinylidene fluoride (PVDF), polytetrafluoroethylene (PTFE), polyvinyl fluoride (PVF), and methyl acrylate, may be used. Among these, carboxymethyl cellulose (CMC), methyl acrylate or polyvinylidene fluoride (PVDF) is preferably used. These compounds may be used alone or in combination of two or more.

The content of the binder in the heat resistant insulation layer is preferably in the range from 2% by mass to 20% by mass with respect to 100% by mass of the heat resistant insulation layer. The content of 2% by mass or greater can increase the strength against separation between the porous substrate layer and the heat resistant insulation layer so as to improve oscillation resistance of the separator. In addition, the content of 20% by mass or lower can ensure sufficient lithium ion conductivity since the gaps between the adjacent inorganic particles are kept sufficiently.

The thickness T2 of one heat resistant insulation layer is preferably in the range from 1 μm to 20 μm, more preferably in the range from 2 μm to 10 μm, still more preferably in the range from 3 μm to 7 μm. The heat resistant insulation layer with such a thickness can provide sufficient strength to the separator with a heat resistant insulation layer and can avoid an excessive increase in volume or weight of the separator itself.

The entire thickness of the separator with a heat resistant insulation layer according to the present embodiment is not particularly limited as long as sufficient strength can be ensured. However, the separator preferably has a thickness which is not excessively increased in view of a further reduction in size of the battery. In particular, the entire thickness of the separator with a heat resistant insulation layer is preferably in the range from 10 μm to 50 μm, more preferably in the range from 15 μm to 30 μm.

The separator with a heat resistant insulation layer according to the present embodiment is characterized in that R represented by the following mathematical formula 1 is in the range from 0.3 to 20.

$$R = \frac{\text{Tensile Strength in } MD \text{ Direction} \times \text{Fracture Strain in } MD \text{ Direction}}{\text{Tensile Strength in } TD \text{ Direction} \times \text{Fracture Strain in } TD \text{ Direction}} \quad (1)$$

In the mathematical formula 1, "MD direction (machine direction)" represents a flow direction when manufacturing the separator in a roll state, and "TD direction (transverse direction)" represents a direction perpendicular to the MD direction. "MD" and "TD" are terms generally used in the film processing field to indicate a direction of a material in a roll state or a sheet-like material cut out from the material in a roll state. Here, the difference between the MD direction and the TD direction in the sheet-like separator with a heat resistant insulation layer cut out from a material in a roll state, can be determined in such a manner as to observe the heat resistant insulation layer or the porous substrate layer (in particular, the resin porous substrate layer) with a scanning electron microscope (SEM). In addition, "tensile strength" and "fracture strain" in the present description employ the values obtained by the method used in examples described below.

In the separator with a heat resistant insulation layer according to the present embodiment, R is required to be in the range from 0.3 to 20, preferably in the range from 0.5 to 10, more preferably in the range from 0.7 to 5. As is described in examples and comparative examples below, when R is less than 0.3 or greater than 20, an internal short circuit may be caused with a smaller load compared with the case where R is in the range from 0.3 to 20. Therefore, R in the range from 0.3 to 20 is an essential condition to prevent an internal short circuit. This R may be controlled, for example, in such a manner as to adjust extension conditions of the resin porous substrate layer as explained in the manufacture method below.

Here, if the tensile strength or the fracture strain in the MD direction or in the TD direction is extremely small, preferred short-circuit resistance may not be obtained. Thus, the tensile strength in each of the MD direction and the TD direction is preferably in the range from 10 MPa to 150 MPa, and the fracture strain in each of the MD direction and the TD direction is preferably in the range from 10% to 150%. More particularly, the tensile strength in the MD direction is more preferably in the range from 50 MPa to 150 MPa, and the tensile strength in the TD direction is more preferably in the range from 30 MPa to 100 MPa. The fracture strain in the MD direction is more preferably in the range from 40% to 80%, and the fracture strain in the TD direction is more preferably in the range from 40% to 100%.

The separator with a heat resistant insulation layer according to the present embodiment is also characterized in that the ratio of the unit mass of the heat resistant insulation layer to the unit mass of the porous substrate layer (the unit mass of the heat resistant insulation layer/the unit mass of the porous substrate layer) is in the range from 0.5 to 2.5. In the present description, the "unit mass" represents a mass (g) per square meter (the unit is [$g/m^2$]). It should be noted that the unit mass ratio obtained by dividing the unit mass value of the heat resistant insulation layer by the unit mass value of the porous substrate layer has no unit.

The unit mass ratio in the separator with a heat resistant insulation layer according to the present embodiment is required to be in the range from 0.5 to 2.5, preferably in the rang from 0.7 to 2.2, more preferably in the range from 0.9 to 1.3. As is described in examples and comparative examples below, when the unit mass ratio is less than 0.5 or greater than 2.5, an internal short circuit is caused with a smaller load compared with the case where the unit mass ratio is in the range from 0.5 to 2.5. Therefore, the unit mass ratio in the range from 0.5 to 2.5 is an essential condition to prevent an internal short circuit. This unit mass ratio may be controlled, for example, in such a manner as to adjust the amount of the dispersion liquid containing the inorganic particles and the binder applied to the porous substrate layer, as explained in the manufacture method below.

The above-described R and unit mass ratio are parameters which are mutually independent. However, as explained in examples below, the case where R is in the range from 0.5 to 10 and the unit mass ratio is in the range from 0.7 to 2.2 is more preferable, and the case where R is in the range from 0.7 to 5 and the unit mass ratio is in the range from 0.9 to 1.3 is even more preferable. By setting the respective parameters to these ranges, the short-circuit resistance can be further improved.

<Method for Manufacturing Separator with Heat Resistant Insulation Layer>

The separator with a heat resistant insulation layer according to the present embodiment may be manufactured with no particular limitation with reference to conventionally-known techniques as appropriate. The following is an explanation of the method for manufacturing the separator with a heat resistant insulation layer in the case of using the resin porous substrate layer as the porous substrate layer.

When a polyolefin microporous film is prepared as the resin porous substrate layer, polyolefin is first dissolved in a solvent. The solvent is not limited as long as polyolefin can be dissolved therein, but examples thereof include paraffin, liquid paraffin, paraffin oil, tetralin, ethylene glycol, glycerin, and decalin.

Next, the dissolved material is extruded into a sheet-like shape, the solvent is removed therefrom, and the material thus obtained is subjected to uniaxial or biaxial stretching (simultaneous, sequential) so that the microporous film may be prepared. In this case, simultaneous biaxial stretching or sequential biaxial stretching is preferably used in order to set R in the range from 0.3 to 20. The use of simultaneous biaxial stretching or sequential biaxial stretching can prevent an excessive difference in value of [tensile strength×fracture strain] between the MD direction and the TD direction. Here, the value of [tensile strength×fracture strain] in the extension direction tends to decrease as the extension temperature increases. Therefore, in the case of using uniaxial stretching, the extension temperature is preferably set to 40° C. or lower, more preferably set to 30° C. or lower.

Next, the method of forming the heat resistant insulation layer on the resin porous substrate layer is explained. First, dispersion liquid is prepared in a manner such that the inorganic particles and the binder are dispersed in a solvent. The dispersion liquid is applied to one surface or both surfaces of the resin porous substrate layer, and the solvent is then dried so as to form the heat resistant insulation layer.

Examples of the solvent used in this case include N-methyl-2-pyrrolidone (NMP), dimethylformamide, dimethylacetamide, methylformamide, cyclohexane, hexane, and water. When polyvinylidene fluoride (PVDF) is used as a binder, NMP is preferably used as a solvent.

Subsequently, the dispersion liquid is applied to the resin porous substrate layer. The method for applying the dispersion liquid is not particularly limited, and examples thereof include a knife coater method, a gravure coater method, a screen printing method, a meyer bar method, a die coater method, a reverse roll coater method, an ink-jet method, a spray method, and a roll coater method. In this case, the unit mass ratio can be controlled to the predetermined range in such a manner as to adjust the application amount of the dispersion liquid to the resin porous substrate layer. For example, the application amount may be adjusted in a manner such that the unit mass of the heat resistant insulation layer is set approximately in the range from 5 g/m$^2$ to 20 g/m$^2$.

The temperature at which the solvent is removed after the application of the dispersion liquid is not particularly limited and may be determined as appropriate depending on the solvent used. For example, the temperature is preferably in the range from 50° C. to 70° C. when water is used as a solvent, and the temperature is preferably in the range from 70° C. to 90° C. when NMP is used as a solvent. The solvent may be dried under reduced pressure as necessary. Here, the solvent may partly be left without completely removed.

<Electric device> The separator with a heat resistant insulation layer according to the present embodiment is suitable for use in various types of electric devices due to the high short-circuit resistance. The electric devices are not particularly limited as long as the separator is used therein as an essential member, and examples thereof include a secondary battery such as a lithium ion secondary battery and a nickel-hydrogen secondary battery, and an electric double-layer capacitor. Hereinafter, a lithium ion secondary battery, as an example of the electric devices, including the separator with a heat resistant insulation layer according to the present embodiment is explained.

Figure 2:
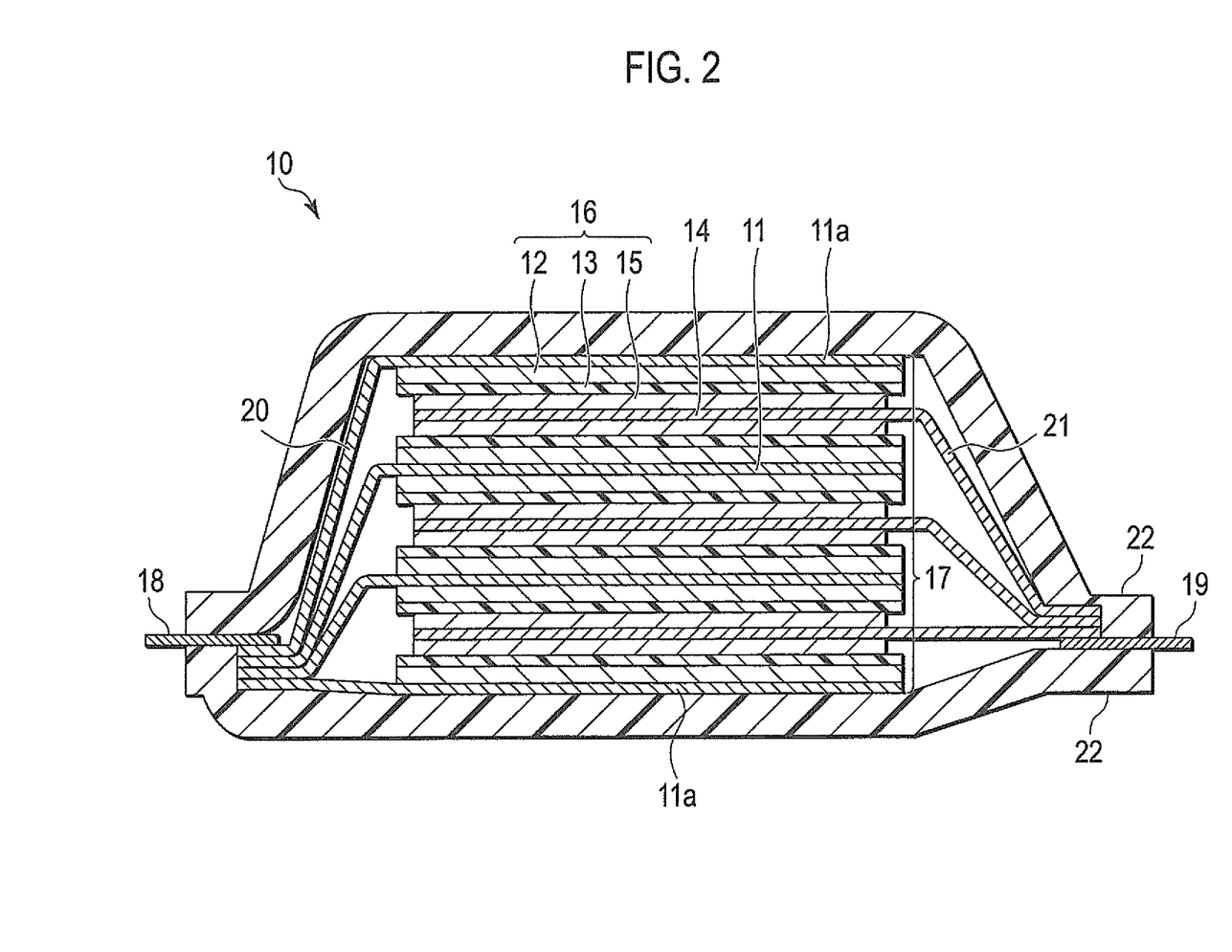
FIG. 2 is a cross-sectional view schematically showing the entire structure of a laminated type lithium ion secondary battery according to an embodiment of the present invention.

FIG. 2 is a schematic view showing the entire structure of a laminated type lithium ion secondary battery according to an embodiment of the present invention. A lithium ion secondary battery 10 according to the present embodiment has a configuration in which a power generation element 17, in which a charge-discharge reaction actually progresses, is sealed inside a laminate film 22 as a battery exterior member. In particular, a polymer-metal composite laminate film is used as a battery exterior member, and the periphery thereof is entirely thermally fused, so that the power generation element 17 is enclosed and tightly sealed therein.

The power generation element 17 has a laminated structure including: negative electrodes each having a configuration in which negative electrode active material layers 12 are provided on both surfaces of a negative electrode current collector 11; electrolyte layers 13; and positive electrodes each having a configuration in which positive electrode active material layers 15 are provided on both surfaces of a positive electrode current collector 14. In particular, several sets of the negative electrode, the electrolyte layer 13 and the positive electrode arranged in this order are laminated on top of each other in a manner such that one negative electrode active material layer 12 faces one positive electrode active material layer 15 via the electrolyte layer 13 interposed therebetween.

The negative electrode, the electrolyte layer 13 and the positive electrode which are adjacent to one another thus constitute a single cell layer 16. Namely, the lithium ion secondary battery 10 according to the present embodiment has a constitution in which the plural single cell layers 16 are laminated on top of each other so as to be electrically connected in parallel. The periphery of each of the single cell layers 16 may be provided with a seal member (an insulation layer) (not shown in the figure) for insulation between the negative electrode current collector 11 and the positive electrode current collector 14 interposing each single cell layer 16 therebetween. The outermost negative electrode current collectors 11a located on both outermost layers (the uppermost layer and the lowermost layer) of the power generation element 17 are each provided with the negative electrode active material layer 12 only on one side thereof. Alternatively, the outermost positive electrode current collectors located on both outermost layers of the power generation element 17 may each be provided with the positive electrode active material layer only on one side thereof in a manner such that the positions of the negative electrode and the positive electrode are reversed.

A negative electrode current collecting plate (a negative electrode tab) 18 and a positive electrode current collecting plate (a positive electrode tab) 19 which are electrically conductive to the respective electrodes (the positive electrodes and the negative electrodes) are attached to the negative electrode current collectors 11 and the positive electrode current collectors 14 respectively. The negative electrode current collecting plate 18 and the positive electrode current collecting plate 19 are partly held by each end portion of the laminate film 22 and exposed to the outside of the laminate film 22. The negative electrode current collecting plate 18 and the positive electrode current collecting plate 19 may be attached to the negative electrode current collectors 11 and the positive electrode current collectors 14 of the respective electrodes via negative electrode leads 20 and positive electrode leads 21 as necessary. In such a case, the negative electrode current collecting plate 18 and the positive electrode current collecting plate 19 may be connected to the negative electrode leads 20 and the positive electrode leads 21 respectively by, for example, ultrasonic welding or resistance welding. Note that each negative electrode current collector 11 may be elongated to serve as the negative electrode current collecting plate 18 and exposed to the outside of the laminate film 22. Similarly, each positive electrode current collector 14 may be elongated to serve as the positive electrode current collecting plate 19 and exposed to the outside of the laminate film 22.

In FIG. 2, the separator with a heat resistant insulation layer composes the electrolyte layer 13 together with the electrolyte (the electrolysis solution). The laminated type lithium ion secondary battery shown in FIG. 2 has greatly improved short-circuit resistance due to the use of the separator with a heat resistant insulation layer. Accordingly, the lithium ion secondary battery according to the present embodiment can provide sufficient safety and reliability even when applied to an electric vehicle having a high capacity and high output power.

The electrolyte layer 13 is explained in more detail below. The electrolyte layer is not particularly limited as long as it is formed by use of the separator according to the present embodiment. Namely, the electrolyte layer of the present embodiment includes the separator, and the electrolyte contained in the porous substrate layer and the heat resistant insulation layer of the separator. The electrolyte held in the electrolyte layer preferably contains lithium ions and has high lithium ion conductivity.

In particular, the electrolyte layer may use the separator containing an electrolysis solution having high ion conductivity. Alternatively, the electrolyte layer in which a gel electrolyte or the like is contained in the separator by impregnation, application or spray, may be used.

With regard to the electrolysis solution capable of permeating the separator, the electrolyte used may be at least one of $LiClO_4$, $LiAsF_6$, $LiPF_5$, LiBOB, $LiCF_3SO_3$, and $Li(CF_3SO_2)_2N$. The solvent for the electrolysis solution may be at least one ether selected from the group consisting of ethylene carbonate (EC), propylene carbonate (PC), diethyl carbonate (DEC), dimethyl carbonate, ethyl methyl carbonate, 1,2-dimethoxyethane, 1,2-diethoxyethane, tetrahydrofuran, 1,3-dioxolan, and γ-butyrolactone. The electrolysis solution prepared in a manner such that the electrolyte is dissolved in the solvent and the concentration of the electrolyte is set in the range from 0.5 M to 2 M, is preferably used. However, the present invention is not limited to these examples.

The gel electrolyte has a constitution in which the liquid electrolyte (the electrolysis solution) is poured in a matrix polymer including an ion conductive polymer. Examples of the ion conductive polymer used for the matrix polymer include polyethylene oxide (PEO), polypropylene oxide (PPO), and a copolymer thereof. In such a polyalkylene oxide polymer, electrolyte salt such as lithium salt can sufficiently be dissolved.

The content ratio of the liquid electrolyte (the electrolysis solution) in the gel electrolyte is not particularly limited, but is preferably in the range from several % by mass to 98% by mass in view of ion conductivity and the like. According to the present embodiment, the gel electrolyte exhibits better effects particularly when a large amount of the electrolysis solution is contained therein, namely, when the content ratio of the electrolysis solution is greater than or equal to 70% by mass.

EXAMPLES

The effects of the present invention will be explained with reference to the following examples and comparative examples. However, the scope of the present invention is not limited only to the following examples.
<Manufacture of Separator with Heat Resistant Insulation Layer>

Example 1

First, a melting mixture of polyethylene (PE) and liquid paraffin as a plasticizer was prepared, and the melting mixture thus obtained was extruded into a sheet-like shape. The plasticizer was removed from the sheet-like melting mixture by use of an extraction solvent, and the sheet-like mixture was further stretched. The sheet-like mixture was subjected to uniaxial stretching in the MD direction at stretching temperature of 25° C. Accordingly, a polyethylene microporous film was obtained as a porous substrate layer. The polyethylene microporous film has a thickness of 16 μm and a porosity of 55%.

Next, 95 parts by mass of alumina particles as inorganic particles and 5 parts by mass of carboxymethyl cellulose as a binder were uniformly dispersed in water so as to prepare dispersion liquid. The dispersion liquid thus obtained was applied to both surfaces of the polyethylene microporous film by use of a gravure coater. The film thus obtained was dried at 60° C. so as to remove water. Accordingly, a separator with a heat resistant insulation layer was manufactured having an entire thickness of 25 μm in which heat resistant insulation layers each having a thickness of 4.5 μm were formed on both surfaces of the polyethylene microporous film.

Example 2

In the preparation of the porous substrate layer, simultaneous biaxial stretching was used as a stretching means (at stretching temperature of 25° C.) to obtain the polyethylene microporous film. The polyethylene microporous film has a thickness of 16 μm and a porosity of 55%. The separator with a heat resistant insulation layer of this example was obtained in the same manner as Example 1 other than this preparation process. [0060]

Example 3

In the preparation of the porous substrate layer, sequential biaxial stretching was used as a stretching means (at stretching temperature of 25° C.) to obtain the polyethylene microporous film. The polyethylene microporous film has a thickness of 16 μm and a porosity of 55%. The separator with a heat resistant insulation layer of this example was obtained in the same manner as Example 1 other than this preparation process.

Example 4

In the preparation of the porous substrate layer, sequential biaxial stretching was used as a stretching means (at stretching temperature of 50° C.) to obtain the polyethylene microporous film. The polyethylene microporous film has a thickness of 16 μm and a porosity of 55%. The separator with a heat resistant insulation layer of this example was obtained in the same manner as Example 1 other than this preparation process.

Example 5

In the preparation of the porous substrate layer, uniaxial stretching in the TD direction was used as a stretching means (at stretching temperature of 25° C.) to obtain the polyethylene microporous film. The polyethylene microporous film has a thickness of 16 μm and a porosity of 55%. The separator with a heat resistant insulation layer of this example was obtained in the same manner as Example 1 other than this preparation process.

Example 6

In the preparation of the porous substrate layer, uniaxial stretching in the TD direction was used as a stretching means (at stretching temperature of 50° C.) to obtain the polyethylene microporous film. The polyethylene microporous film has a thickness of 16 μm and a porosity of 55%. The separator with a heat resistant insulation layer of this example was obtained in the same manner as Example 1 other than this preparation process.

Example 7

In the preparation of the porous substrate layer, the amount of PE used was adjusted and uniaxial stretching in the MD direction was used as a stretching means (at stretching temperature of 25° C.) to obtain the polyethylene microporous film. The polyethylene microporous film has a thickness of 18 μm and a porosity of 55%. In addition, the application amount of the dispersion liquid containing the inorganic particles and the binder was adjusted so as to form heat resistant insulation layers each having a thickness of 4.0 μm on both surfaces of the microporous film. The separator with a heat resistant insulation layer of this example was obtained in the same manner as Example 1 other than these preparation processes.

Example 8

In the preparation of the porous substrate layer, the amount of PE used was adjusted and uniaxial stretching in the MD direction was used as a stretching means (at stretching temperature of 25° C.) to obtain the polyethylene microporous film. The polyethylene microporous film has a thickness of 17 μm and a porosity of 55%. In addition, the application amount of the dispersion liquid containing the inorganic particles and the binder was adjusted so as to form heat resistant insulation layers each having a thickness of 4.0 μm on both surfaces of the microporous film. The separator with a heat resistant insulation layer of this example was obtained in the same manner as Example 1 other than these preparation processes.

Example 9

In the preparation of the porous substrate layer, the amounts of PE and the plasticizer used were adjusted and uniaxial stretching in the MD direction was used as a stretching means (at stretching temperature of 25° C.) to obtain the polyethylene microporous film. The polyethylene microporous film has a thickness of 15 μm and a porosity of 60%. The plasticizer used was finally completely removed by use of an extraction solvent. In addition, the application amount of the dispersion liquid containing the inorganic particles and the binder was adjusted so as to form heat resistant insulation layers each having a thickness of 5.0 μm on both surfaces of the microporous film. The separator with a heat resistant insulation layer of this example was obtained in the same manner as Example 1 other than these preparation processes.

Example 10

In the preparation of the porous substrate layer, the amounts of PE and the plasticizer used were adjusted and uniaxial stretching in the MD direction was used as a stretching means (at stretching temperature of 25° C.) to obtain the polyethylene microporous film. The polyethylene microporous film has a thickness of 14 μm and a porosity of 60%. In addition, the application amount of the dispersion liquid containing the inorganic particles and the binder was adjusted so as to form heat resistant insulation layers each having a thickness of 5.5 μm on both surfaces of the microporous film. The separator with a heat resistant insulation layer of this example was obtained in the same manner as Example 1 other than these preparation processes.

Example 11

In the preparation of the porous substrate layer, the amounts of PE and the plasticizer used were adjusted and uniaxial stretching in the MD direction was used as a stretching means (at stretching temperature of 25° C.) to obtain the polyethylene microporous film. The polyethylene microporous film has a thickness of 14 μm and a porosity of 60%. In addition, the application amount of the dispersion liquid containing the inorganic particles and the binder was adjusted so as to form heat resistant insulation layers each having a thickness of 6.0 μm on both surfaces of the microporous film. The separator with a heat resistant insulation layer of this example was obtained in the same manner as Example 1 other than these preparation processes.

Example 12

In the preparation of the porous substrate layer, the amount of PE used was adjusted and sequential biaxial stretching was used as a stretching means (at stretching temperature of 25° C.) to obtain the polyethylene microporous film. The polyethylene microporous film has a thickness of 18 μm and a porosity of 55%. In addition, the application amount of the dispersion liquid containing the inorganic particles and the binder was adjusted so as to form heat resistant insulation layers each having a thickness of 4.0 μm on both surfaces of the microporous film. The separator with a heat resistant insulation layer of this example was obtained in the same manner as Example 1 other than these preparation processes.

Example 13

In the preparation of the porous substrate layer, the amounts of PE and the plasticizer used were adjusted and sequential biaxial stretching was used as a stretching means (at stretching temperature of 25° C.) to obtain the polyethylene microporous film. The polyethylene microporous film has a thickness of 14 μm and a porosity of 60%. The separator with a heat resistant insulation layer of this example was obtained in the same manner as Example 1 other than this preparation process.

Example 14

In the preparation of the porous substrate layer, the amount of PE used was adjusted and simultaneous biaxial stretching was used as a stretching means (at stretching temperature of 25° C.) to obtain the polyethylene microporous film. The polyethylene microporous film has a thickness of 18 μm and a porosity of 55%. The separator with a heat resistant insulation layer of this example was obtained in the same manner as Example 1 other than this preparation process.

Example 15

In the preparation of the porous substrate layer, the amount of PE used was adjusted and simultaneous biaxial stretching was used as a stretching means (at stretching temperature of 25° C.) to obtain the polyethylene microporous film. The polyethylene microporous film has a thickness of 14 μm and a porosity of 60%. The separator with a heat resistant insulation layer of this example was obtained in the same manner as Example 1 other than this preparation process.

Comparative Example 1

In the preparation of the porous substrate layer, uniaxial stretching in the MD direction was used as a stretching means (at stretching temperature of 50° C.) to obtain the polyethylene microporous film. The polyethylene microporous film has a thickness of 16 μm and a porosity of 55%. The separator with a heat resistant insulation layer of this example was obtained in the same manner as Example 1 other than this preparation process.

Comparative Example 2

In the preparation of the porous substrate layer, polypropylene (PP) was used as resin and uniaxial stretching in the TD direction was used as a stretching means (at stretching temperature of 50° C.) to obtain the polypropylene microporous film. The polypropylene microporous film has a thickness of 16 μm and a porosity of 55%. The separator with a heat resistant insulation layer of this example was obtained in the same manner as Example 1 other than this preparation process.

Comparative Example 3

The polyethylene microporous film was obtained in the same manner as Example 1 except that, in the preparation of the porous substrate layer, the amount of PE used was adjusted and uniaxial stretching in the MD direction was used as a stretching means (at stretching temperature of 25° C.). The polyethylene microporous film has a thickness of 25 μm and a porosity of 55%. The polyethylene microporous film thus obtained was used as the separator (namely, the separator of Comparative Example 3 includes no heat resistant insulation layer).

Comparative Example 4

In the preparation of the porous substrate layer, the amount of PE used was adjusted and uniaxial stretching in the MD direction was used as a stretching means (at stretching temperature of 25° C.) to obtain the polyethylene microporous film. The polyethylene microporous film has a thickness of 19.0 μm and a porosity of 55%. In addition, the application amount of the dispersion liquid containing the inorganic particles and the binder was adjusted so as to form heat resistant insulation layers each having a thickness of 3.5 μm on both surfaces of the microporous film. The separator with a heat resistant insulation layer of this example was obtained in the same manner as Example 1 other than these preparation processes.

Comparative Example 5

In the preparation of the porous substrate layer, the amounts of PE and the plasticizer used were adjusted and uniaxial stretching in the MD direction was used as a stretching means (at stretching temperature of 25° C.) to obtain the polyethylene microporous film. The polyethylene microporous film has a thickness of 13.5 μm and a porosity of 60%. In addition, the application amount of the dispersion liquid containing the inorganic particles and the binder was adjusted so as to form heat resistant insulation layers each having a thickness of 6.0 μm on both surfaces of the microporous film. The separator with a heat resistant insulation layer of this example was obtained in the same manner as Example 1 other than these preparation processes.

<Measurement of Tensile Strength and Fracture Strain>

The tensile strength and the fracture strain were measured in accordance with IS0527-1, 2. In particular, first, the separator manufactured in each of Examples and Comparative Examples was cut into a piece of 50 mm×10 mm. Next, the both ends (10 mm) of the separator were fixed to a tabletop precision universal testing machine (manufactured by Shimadzu Corporation) to be subjected to a tensile test at a test rate of 50 mm/min at 25° C. The distance between the chucks (test piece holding tools) was 30 mm. The tensile test was continued until the separator ruptured. The tensile test was performed in each of the MD direction and the TD direction to measure the tensile strength and the fracture strain in the respective directions. Table 1 shows the results thereof.

<Calculation of Unit Mass Ratio>

The ratio of the unit mass of the heat resistant insulation layer to the unit mass of the porous substrate layer was calculated in the separator with a heat resistant insulation layer manufactured in each of Examples and Comparative Examples. Note that "the unit mass of the heat resistant insulation layer" is a total unit mass of the two heat resistant insulation layers.

Table 1 shows the results thereof. The unit mass of the porous substrate layer can be obtained from the mass and the area of the microporous film in each of Examples and Comparative Examples. The unit mass of the heat resistant insulation layer can be obtained in a manner such that the unit mass of the separator with a heat resistant insulation layer was obtained from the mass and the area of the manufactured separator with a heat resistant insulation layer so as to subtract the unit mass of the porous substrate layer from the unit mass of the separator with a heat resistant insulation layer thus obtained.

<Foreign Body Short-Circuit Test>

[Manufacture of Cell] First, 85% by mass of $LiMn_2O_4$ as a positive electrode active material, 5% by mass of acetylene black as an electronic conducting additive, 10% by mass of polyvinylidene fluoride (PVDF) as a binder, and an appropriate amount of N-methyl-2-pyrrolidone (NMP) as a slurry viscosity control solvent were mixed to prepare positive electrode active material slurry. Similarly, 90% by mass of graphite as a negative electrode active material, 5% by mass of acetylene black as an electronic conducting additive, 10% by mass of PVDF as a binder, and an appropriate amount of NMP as a slurry viscosity control solvent were mixed to prepare negative electrode active material slurry.

Next, the positive electrode active material slurry was applied to an aluminum foil and then dried so as to prepare a positive electrode. Similarly, the negative electrode active material slurry was applied to a copper foil and then dried so as to prepare a negative electrode. Next, these electrodes were each cut into a piece of 4.8 cm×4.8 cm. In addition, the separator manufactured in each of Examples and Comparative Examples was cut into a piece of 5.0 cm×5.0 cm. Further, tabs were attached, by ultrasonic welding, to peripheral portions of the respective electrodes to which no active material was applied. Namely, an aluminum tab was attached to the positive electrode, and a nickel tab was attached to the negative electrode.

Subsequently, a nickel piece in accordance with "Forced internal short circuit of cells" of Japan Industrial Standard JIS C8714:2007, was inserted between the positive electrode and the separator, and the negative electrode was placed to face the positive electrode with the separator interposed therebetween. The nickel piece has a height×a width×a side of 0.2 mm×0.1 mm×1 mm. Further, polypropylene plates for reinforcement were placed on the outermost layers (on the outside of each of the positive electrode and the negative electrode) and then laminated in vacuum, so as to prepare a test cell.

[Evaluation] First, the tabs of the test cell were connected to a direct-current resistance measuring apparatus, and the test cell was fixed to a pressure jig with a tape. The Ni piece was pressed from the outside of the test cell with a load from 0 N to 400 N at a rate of 0.1 mm/sec by use of an acrylic stick with 5 mm×5 mm, so as to measure the change in resistance during the pressure application.

Figure 3:
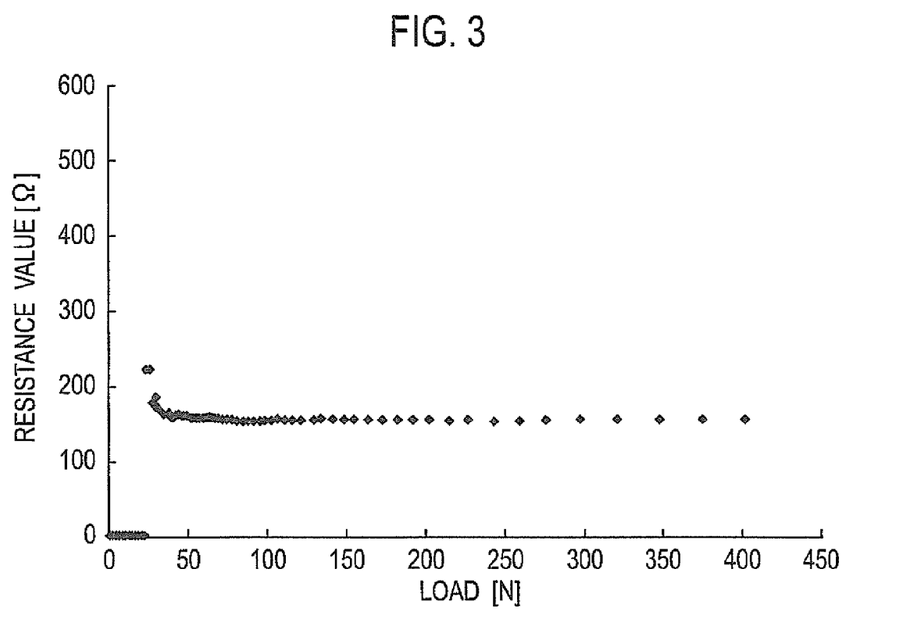
FIG. 3 is a graph plotting values of resistance with respect to load obtained by a foreign body short-circuit test.

FIG. 3 is a graph showing an example of the measurement results while plotting the values of the resistance with respect to the load. The resistance at the point when the load was turned on was too large to be measured. However, the resistance significantly decreased when the load increased because the Ni piece passed through the separator and then reached the negative electrode so that the internal short circuit occurred. The load at the point of the appearance of such decreased resistance was defined as a load during the internal short circuit, and the respective separators were evaluated accordingly. Table 1 shows the results thereof. Note that, in the graph of FIG. 3, the values of the resistance before the internal short circuit were plotted as "0".

TABLE 1

| | Tensile Strength × Fracture Strain [MPa×%] | | R Value | Unit Mass Ratio | Resin | Film Thickness [μm] | Porosity [%] | Stretch Means | Stretch Temperature [° C.] | Thickness of Heat Resistant Insulation Layer (One Layer) [μm] | Load During Short Circuit [N] |
|---|---|---|---|---|---|---|---|---|---|---|---|
| | MD Direction | TD Direction | | | | | | | | | |
| Example 1 | 3021 | 8885 | 0.34 | 1.19 | PE | 16 | 55 | Uniaxial Stretch (MD) | 25 | 4.5 | 29.3 |
| Example 2 | 6078 | 8429 | 0.7 | 1.21 | PE | 16 | 55 | Simultaneous Biaxial Stretch | 25 | 4.5 | 33.1 |
| Example 3 | 5145 | 3018 | 1.71 | 1.2 | PE | 16 | 55 | Sequential Biaxial Stretch | 25 | 4.5 | 35.2 |
| Example 4 | 6315 | 721 | 8.76 | 1.2 | PE | 16 | 55 | Sequential Biaxial Stretch | 50 | 4.5 | 29.5 |
| Example 5 | 8515 | 681.2 | 12.5 | 1.19 | PE | 16 | 55 | Uniaxial Stretch (TD) | 25 | 4.5 | 27.3 |
| Example 6 | 9699 | 519 | 18.7 | 1.2 | PE | 16 | 55 | Uniaxial Stretch (TD) | 50 | 4.5 | 23.8 |
| Example 7 | 3125 | 8929 | 0.35 | 0.54 | PE | 18 | 55 | Uniaxial Stretch (MD) | 25 | 4.0 | 23.9 |
| Example 8 | 3051 | 8475 | 0.36 | 0.72 | PE | 17 | 55 | Uniaxial Stretch (MD) | 25 | 4.0 | 24.7 |
| Example 9 | 3099 | 8854 | 0.35 | 1.79 | PE | 15 | 60 | Uniaxial Stretch (MD) | 25 | 5.0 | 26.2 |
| Example 10 | 3211 | 8919 | 0.36 | 2.06 | PE | 14 | 60 | Uniaxial Stretch (MD) | 25 | 5.5 | 25.5 |
| Example 11 | 3065 | 8514 | 0.36 | 2.48 | PE | 14 | 60 | Uniaxial Stretch (MD) | 25 | 6.0 | 23.9 |
| Example 12 | 5256 | 3074 | 1.71 | 0.52 | PE | 18 | 55 | Sequential Biaxial Stretch | 25 | 4.0 | 32.4 |
| Example 13 | 5394 | 3173 | 1.7 | 2.43 | PE | 14 | 60 | Sequential Biaxial Stretch | 25 | 4.5 | 31.1 |
| Example 14 | 6253 | 8807 | 0.71 | 0.55 | PE | 18 | 55 | Simultaneous Biaxial Stretch | 25 | 4.5 | 27.9 |
| Example 15 | 6135 | 8521 | 0.72 | 2.39 | PE | 14 | 60 | Simultaneous Biaxial Stretch | 25 | 4.5 | 26.8 |
| Comparative Example 1 | 2891 | 11564 | 0.25 | 1.19 | PE | 16 | 55 | Uniaxial Stretch (MD) | 50 | 4.5 | 20 |
| Comparative Example 2 | 10876 | 523 | 20.8 | 1.19 | PP | 16 | 55 | Uniaxial Stretch (TD) | 50 | 4.5 | 19.8 |
| Comparative Example 3 | 2509 | 5791 | 0.33 | — | PE | 25 | 55 | Uniaxial Stretch (MD) | 25 | — | 16.1 |

TABLE 1-continued

|  | Tensile Strength × Fracture Strain [MPa×%] | | R Value | Unit Mass Ratio | Resin | Film Thickness [μm] | Porosity [%] | Stretch Means | Stretch Temperature [° C.] | Thickness of Heat Resistant Insulation Layer (One Layer) [μm] | Load During Short Circuit [N] |
|---|---|---|---|---|---|---|---|---|---|---|---|
|  | MD Direction | TD Direction | | | | | | | | | |
| Comparative Example 4 | 3011 | 8856 | 0.34 | 0.45 | PE | 19 | 55 | Uniaxial Stretch (MD) | 25 | 3.5 | 19.7 |
| Comparative Example 5 | 3165 | 9042 | 0.35 | 2.63 | PE | 13.5 | 60 | Uniaxial Stretch (MD) | 25 | 6.0 | 19.7 |

$$R = \frac{\text{Tensile Strength in MD Direction} \times \text{Fracture Strain in MD Direction}}{\text{Tensile Strength in TD Direction} \times \text{Fracture Strain in TD Direction}}$$

$$\text{Unit Mass Ratio} = \frac{\text{Unit Mass of Heat Resistant Insulation Layer}}{\text{Unit Mass of Resin Porous Substrate Layer}}$$

The results shown in Table 1 revealed that Examples 1 to 15 in which R is in the range from 0.3 to 20 and the unit mass ratio is in the range from 0.5 to 2.5, had a greater load during the short circuit, namely had better short-circuit resistance than Comparative Examples 1 to 5 in which R or the unit mass ratio does not fall within the above-mentioned range.

Further, it was found that Examples 1 to 4 and 7 to 10 in which R is in the range from 0.5 to 10 and the unit mass ratio is in the range from 0.7 to 2.2 and particularly Example 3 in which R is in the range from 0.7 to 5 and the unit mass ratio is in the range from 0.9 to 1.3, had further improved short-circuit resistance.

Figure 4:
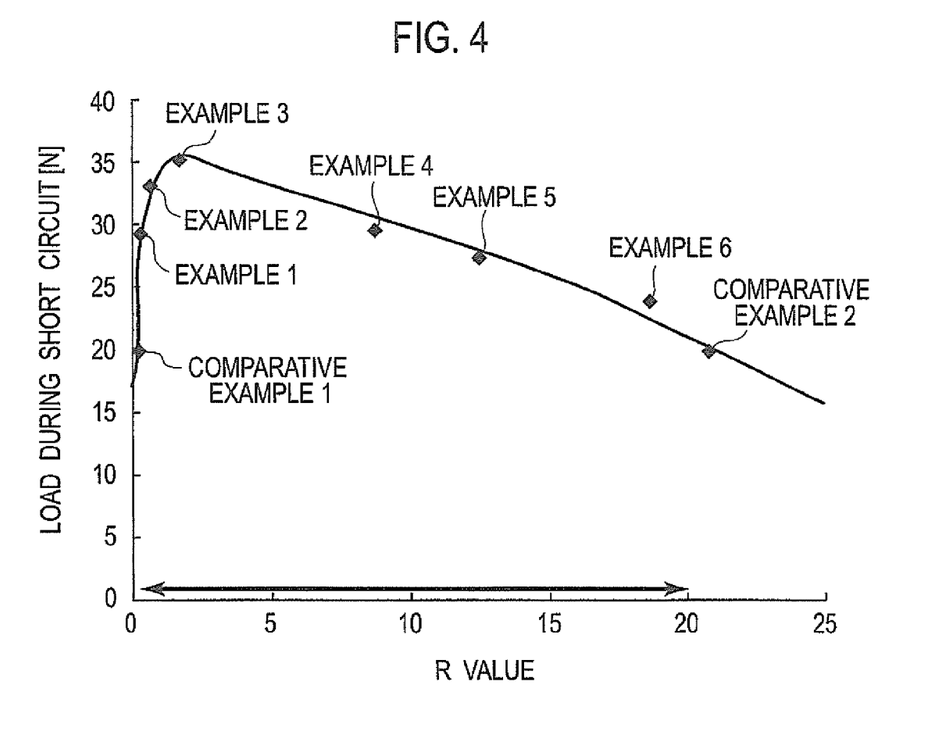
FIG. 4 is a graph plotting values of load during a short circuit with respect to an R value obtained in Examples 1 to 6 and Comparative Examples 1 and 2.

FIG. 4 shows a graph plotting the values of the load during the short circuit with respect to R in Examples 1 to 6 and Comparative Examples 1 and 2 (having a substantially uniform unit mass ratio (1.19 to 1.3)). It is apparent from FIG. 4 that the short-circuit resistance is improved when R is in the range from 0.3 to 20, further in the range from 0.5 to 10, particularly in the range from 0.7 to 5. The reason why the short-circuit resistance is improved as the R value is closer to 1 may be because the mechanical property (tensile strength×fracture strain) which is weak in one direction is prevented from being reflected.

Figure 5:
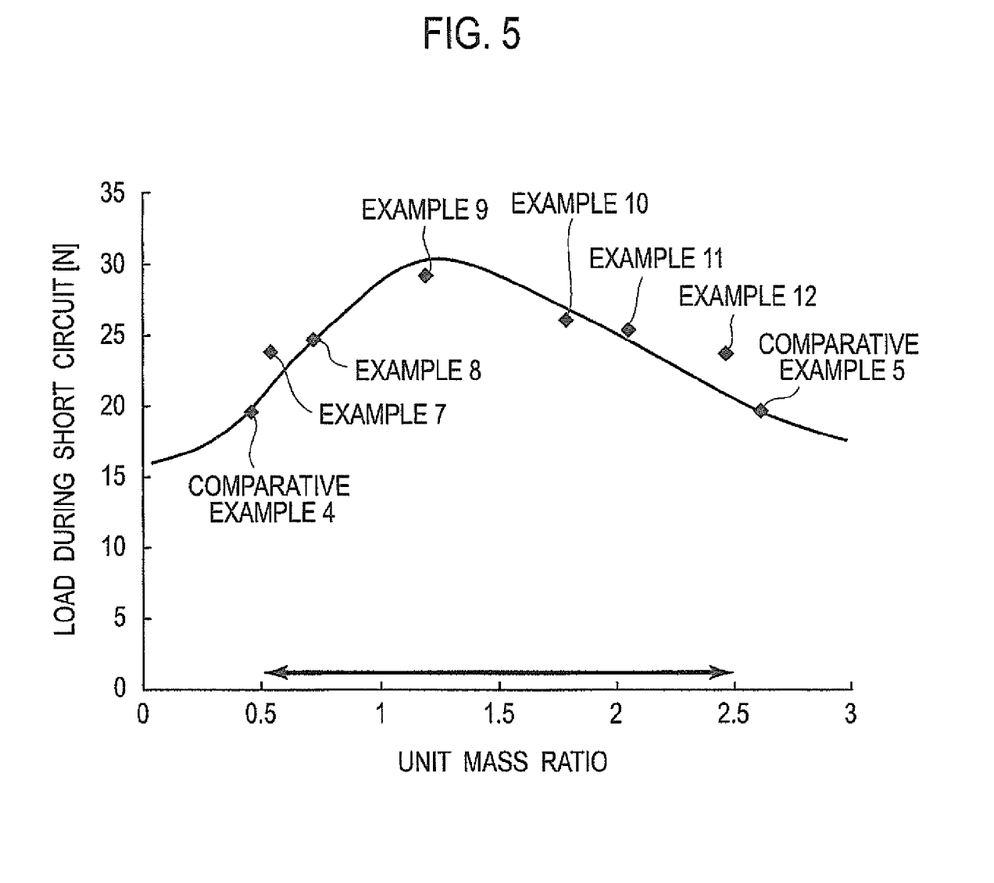
FIG. 5 is a graph plotting values of load during a short circuit with respect to a unit mass ratio obtained in Examples 1 and 7 to 11 and Comparative Examples 4 and 5.

FIG. 5 shows a graph plotting the values of the load during the short circuit with respect to the unit mass ratio in Examples 1 and 7 to 11 and Comparative Examples 4 and 5 (having substantially uniform R (0.33 to 0.36)). It is apparent from FIG. 5 that the short-circuit resistance is improved when the unit mass ratio is in the range from 0.5 to 2.5, further in the range from 0.7 to 2.2, particularly in the range from 0.9 to 1.3. The mechanical strength of the heat resistant insulation layer is not sufficient with the unit mass ratio in the region of smaller than 0.5, so that the internal short circuit may be easily caused. In addition, the fragility of the heat resistant insulation layer increases with the mass ratio in the region of greater than 2.5, so that the internal short circuit may be easily caused.

Although the present invention has been described above by reference to the examples, the present invention is not limited to the descriptions thereof, and it will be apparent to those skilled in the art that various modifications and improvements can be made.

According to the present invention, the separator with a heat resistant insulation layer having sufficient short-circuit resistance can be provided.

The invention claimed is:

1. A separator with a heat resistant insulation layer consisting of:
    a porous substrate layer; and
    a heat resistant insulation layer placed on both surfaces of the porous substrate layer and containing inorganic particles and a binder, wherein the separator has R in a range from 0.3 to 20 and a ratio of a unit mass of the heat resistant insulation layer to a unit mass of the porous substrate layer is in a range from 0.5 to 2.5, and wherein R is defined as:

$$R = \frac{\text{Tensile Strength in } MD \text{ Direction} \times \text{Fracture Strain in } MD \text{ Direction}}{\text{Tensile Strength in } TD \text{ Direction} \times \text{Fracture Strain in } TD \text{ Direction}}.$$

2. The separator with the heat resistant insulation layer according to claim 1, wherein R is in the range from 0.5 to 10, and
    the ratio of the unit mass of the heat resistant insulation layer to the unit mass of the porous substrate layer is in the range from 0.7 to 2.2.

3. The separator with the heat resistant insulation layer according to claim 1, wherein R is in the range from 0.7 to 5, and
    the ratio of the unit mass of the heat resistant insulation layer to the unit mass of the porous substrate layer is in the range from 0.9 to 1.3.

4. The separator with the heat resistant insulation layer according to claim 1, wherein the porous substrate layer contains resin having a melting temperature in a range from 120° C. to 200° C.

5. The separator with the heat resistant insulation layer according to claim 1, wherein the inorganic particles contain at least one material selected from the group consisting of an oxide, a nitride and a hydroxide of silicon, aluminum, zirconium or titanium, and a complex of the oxide, the hydroxide and the nitride.

6. The separator with the heat resistant insulation layer according to claim 1, wherein the porous substrate layer contains at least one material selected from the group consisting of polyethylene, polypropylene, and an ethylene-propylene copolymer.

7. The separator with a heat resistant insulation layer according to claim 1, wherein the porous substrate layer contains a microporous film.

8. The separator with a heat resistant insulation layer according to claim 1, wherein a content of the binder in the heat resistant insulation layer is in a range from 2% by mass to 20% by mass with respect to 100% by mass of the heat resistant insulation layer.

9. A separator with a heat resistant insulation layer consisting of:
a porous substrate layer; and
a heat resistant insulation layer placed on only one surface of the porous substrate layer and containing inorganic particles and a binder, wherein the separator has R in a range from 0.3 to 20, and a ratio of an unit mass of the heat resistant insulation layer to an unit mass of the porous substrate layer is in a range from 0.5 to 2.5, and R is defined as:

$$R = \frac{\text{Tensile Strength in } MD \text{ Direction} \times \text{Fracture Strain in } MD \text{ Direction}}{\text{Tensile Strength in } TD \text{ Direction} \times \text{Fracture Strain in } TD \text{ Direction}}.$$

10. The separator with the heat resistant insulation layer according to claim 9, wherein a content of the binder in the heat resistant insulation layer is in a range from 2% by mass to 20% by mass with respect to 100% by mass of the heat resistant insulation layer.

11. An electric device comprising the separator with a heat resistant insulation layer according to claim 1.

12. The separator with a heat resistant insulation layer according to claim 1, wherein a porosity of the porous substrate layer is 50% or more.

13. The separator with a heat resistant insulation layer according to claim 1, wherein a porosity of the porous substrate layer is 55% or more to 60% or less.

14. The separator with a heat resistant insulation layer according to claim 1, wherein the binder contains at least one material selected from the group consisting of carboxymethyl cellulose, polyacrylonitrile, cellulose, an ethylene-vinyl acetate copolymer, polyvinyl chloride, styrene butadiene rubber, isoprene rubber, butadiene rubber, polyvinylidene fluoride, polytetrafluoroethylene, polyvinyl fluoride and methyl acrylate.

15. The separator with a heat resistant insulation layer according to claim 1, wherein the binder contains at least one material selected from the group consisting of carboxymethyl cellulose, methyl acrylate and polyvinylidene fluoride.

16. The separator with a heat resistant insulation layer according to claim 9, wherein a porosity of the porous substrate layer is 50% or more.

17. The separator with a heat resistant insulation layer according to claim 9, wherein a porosity of the porous substrate layer is 55% or more to 60% or less.

18. The separator with a heat resistant insulation layer according to claim 9, wherein the binder contains at least one material selected from the group consisting of carboxymethyl cellulose, polyacrylonitrile, cellulose, an ethylene-vinyl acetate copolymer, polyvinyl chloride, styrene butadiene rubber, isoprene rubber, butadiene rubber, polyvinylidene fluoride, polytetrafluoroethylene, polyvinyl fluoride and methyl acrylate.

19. The separator with a heat resistant insulation layer according to claim 9, wherein the binder contains at least one material selected from the group consisting of carboxymethyl cellulose, methyl acrylate and polyvinylidene fluoride.

* * * * *